UNITED STATES PATENT OFFICE 2,451,173

RUBBEROID TALL OIL POLYMERS AND PROCESS FOR MAKING THE SAME

Richard Richter, Irvington, N. J., and John J. Miskel, Brooklyn, N. Y., assignors to Nopco Chemical Company, a corporation of New Jersey No Drawing. Application December 24, 1943, Serial No. 515,600

14 Claims. (Cl. 260—97.5)

This invention relates to semi-elastic polymers of tall oil derivatives, the production of these polymers and their use as valuable plastic substances and as plasticizers and extenders in natural and synthetic rubber compositions.

It is known that tall oils may be treated by various means to develop vicinal hydroxy and acetoxy groups on the carbon atoms originally joined by double bonds in the untreated tall oils to yield configurations of the type:

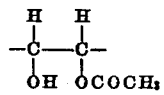

It has been discovered by this invention that such hydroxy acetylated tall oils may be condensed under the influence of heat and in the presence of acidic esterification catalysts to yield polymeric products having semi-elastic yielding-and-recovering rubber-like properties. These condensation products may be vulcanized to yield rubber substitutes capable of replacing rubber in its less exacting applications. The products are also particularly adapted as plasticizers and extenders for natural and synthetic rubbers.

As is well known, tall oils are cheap and plentiful by-products produced by acidification of the waste liquors from the alkaline processes of producing wood-pulp, and are constituted largely of resin acids and unsaturated fatty acids. Tall oils reach the market in various degrees of refinement. They are frequently sold without any refinement whatsoever, in which case, they are known as crude tall oils. Likewise, the tall oils are frequently distilled, crystallized, etc. to remove impurities therefrom before being marketed. In general, any of these commercial tall oil materials may, after suitable treatment to develop hydroxy acetylated configurations therein, serve as starting materials for the production of the polymers of this invention.

A variety of devices are known, whereby hydroxyl and acetoxy groups may be added to the carbon atoms linked by double bonds in the unsaturated constituents of tall oil. However, it is preferred to treat the tall oil with peracetic acid, in which case the following addition takes place across some or all of the double bonds between carbon atoms in the unsaturated constituents of tall oil:

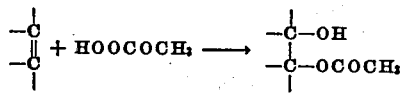

In practice, this reaction is most conveniently carried out by adding acetic anhydride and an aqueous solution of hydrogen peroxide to the tall oils to be treated, the ratio in which the hydrogen peroxide solution and acetic anhydride are furnished being adjusted in proportions such as to yield peracetic acid in the reaction mixture. In general, it will be found best to add the hydrogen peroxide and acetic anhydride in successive relatively small portions as they are consumed by the reaction, so that at no time is there built up any dangerous concentration of peracetic acid. The treatment may be conducted at any temperature high enough to secure an economic rate of reaction, and below that at which the reaction becomes unduly violent. These temperatures naturally vary in accordance with the source and purity of the tall oil used, and accordingly are best determined by small scale experiment for each particular commercial tall oil to be treated. In general, temperatures between about 10° C. and about 90° C. will be found most practical. The total amount of acetic anhydride and of peroxide added should be such as to react upon substantially all of the unsaturation present in the tall oil, although substantially less than completely hydroxy-acetylated tall oils will nevertheless yield polymers of a less satisfactory, but still practical, character. The hydroxy acetylation reaction will ordinarily be complete within from about 2 to about 10 hours.

Instead of being developed by means of peracetic acid, the hydroxy acetylation of the tall oil to form starting materials for the instant invention may be carried out in other ways. For instance, α-glycol groupings may be developed at the double bonds of the tall oil constituents by any suitable means such as treatment with aqueous acetic acid and hydrogen peroxide, and one of the hydroxyl groups thereafter esterified with acetic acid. Alternatively, the tall oil may be treated with hypochlorous acid to produce chlorhydrin configurations, which may then be reacted with acetate salts to yield the desired hydroxyacetylated products. Many other means to the same end will suggest themselves to those skilled in the art; however, at present, the most convenient method for the production of these hydroxy acetylated tall oils appears to be the treatment with peracetic acid as described above.

Coming now to the condensation reactions of this invention, and first to the catalyst employed therein, this catalyst may be any of the catalysts known to promote esterification reactions, such as sulfuric acid; phosphoric acid; hydrochloric acid; paratoluene sulfonic acid; amphoteric metal halides, such as aluminum chloride, boron trifluoride, and the like; iron chloride; and surface-active catalysts such as acid-treated hydrosilicates on the order of the products sold under the trade names of "Floridin," "Tonsil," "Retrol" and the like; or the sulfonated carbonaceous materials such as the material sold under the tradename "Zeo-Carb."

The condensation reaction of this invention is brought about very simply by mixing the selected hydroxy acetylated tall oil with the selected esterification catalyst and heating the mixture with sufficient agitation to insure homogeneity. The temperatures of reaction will be those conventionally used for esterification reactions, that is, temperatures between about 100° C. and about 250° C. The condensation will be substantially complete within from about 1 hour to about 20 hours, depending upon the nature of the tall oil and of the catalyst employed. When cooled, the reaction mass will be found to have been converted to a semi-elastic yielding-and-retracting polymer. This polymer may be used directly without further purification or removal of the esterification catalyst or, alternatively, since the polymer is soluble in organic solvents to a degree dependent on the degree of polymerization, the polymers may be dissolved in such a solvent and the solution washed to extract out the esterification catalyst.

Either the washed or catalyst-containing polymeric substances of this invention may be vulcanized by use of heat in the presence of sulfur, substantially in the same way as rubber compounds are vulcanized, to yield products which are non-tacky, semi-elastic rubber-like vulcanizates. These vulcanizates may be used for many of the less exacting applications of rubber, for instance as gaskets, can and jar seals, matting, pore-sealed expanded plastics, electrical insulation, and the like. These products show somewhat superior resistance to oils and organic solvents as compared to ordinary rubber and synthetic rubber formulations.

Besides serving as starting materials for vulcanizates, the polymeric products of this invention are admirably adapted as plasticizing and extending ingredients in natural and synthetic rubbers. The products are semi-rubbery in consistency and accordingly blend readily with rubbery constituents on conventional milling equipment. When incorporated with rubber and synthetic rubbers, they impart a desirable degree of plasticity, workability, and tackiness to the unvulcanized compound and also serve to soften and flexibilize the finished vulcanizates produced therefrom. This is a particularly unique result in the case of the butadiene rubbers which, as is well known, are extremely difficult to plasticize in a satisfactory manner. The polymers of this invention blend readily in all proportions with butadiene rubbers and serve to impart a highly satisfactory degree of plasticity and workability thereto.

The amount of the polymers of this invention required to impart the degree of plasticity required to work and to mix rubber compounds varies widely and is best determined in the case of any particular compound by preliminary small-scale experiment. Further, as is well known, in compounding rubber the amount of softener used is determined by the use to which the compounded rubber is to be put. It may be stated in general that amounts as small as 5% by weight of the polymers of this invention, based upon the weight of rubber or synthetic rubber in a rubber compound, will impart to that compound a substantial degree of plasticity. Quantities as high as 30% may be incorporated and will impart increasing degrees of plasticity to the compounds without essentially altering the character thereof. Quantities higher than 30% will somewhat impair the elasticity and other rubber-like properties of the compounds and, in such cases, the polymers of this invention take on the character of extenders, serving to cheapen the compounds, while nevertheless retaining a considerable degree of properties similar to those of natural rubber. In general, for plasticizing effects, between about 10% and about 20% of the polymers of this invention will be employed, based upon the rubber or artificial rubber in the compounds to be plasticized. When an extending effect is desired, upwards of 30% will be employed and as much as 50% or 60% may be employed without entirely destroying the essential rubbery character of the compositions in which they are incorporated.

The polymers of this invention, in addition to being susceptible of vulcanization, and capable of serving as plasticizers, are useful in and of themselves as adhesives. For this purpose, they may be dissolved in solvents or dispersed in water, and may be used to form adhesive bonds for paper, leather, cloth, fiber and many other materials.

With the above discussion in mind, there are given herewith specific examples of the practice of this invention. All parts given are by weight.

*Example I*

| | Parts |
|---|---|
| Crude tall oil (44% rosin) | 150 |
| Acetic anhydride | 150 |
| Hydrogen peroxide (30%) | 35 |
| Aluminum chloride | 7½ |

The tall oil, acetic anhydride and hydrogen peroxide were mixed together with application of cooling to keep the temperature below the boiling point of the constituents. After the initial reaction was over the mixture was held at 85° C. for 7 hours. Thereafter the mixture was subjected to vacuum distillation to strip off the acetic acid, leaving behind a clear dark brown heavy oil, which was apparently a hydroxylated acetylated tall oil product, as no resin separated therefrom, even upon chilling.

This hydroxylated acetylated tall oil was then mixed with the aluminum chloride, and the mixture heated at 120° C. until a uniform solution resulted, after which the temperature was raised to 150° C. and kept at this value for 18 hours. The mass, when cooled, constituted an elastic resin which was found to have effective plasticizing properties on natural and synthetic rubbers. The product was especially suitable as a plasticizer and extender for butadiene-styrene synthetic rubbers.

*Example II*

| | Parts |
|---|---|
| Butadiene-styrene rubber | 100 |
| Polymer of Example I | 15 |
| Channel black | 50 |
| Sulfur | 2 |
| Zinc oxide | 5 |
| Stearic acid | 1 |
| Accelerator | 1 |

The above ingredients were compounded on a roll mill, working readily thereon, and yielding a moldable compound. This compound was cured in a press for 45 minutes at 40 pounds steam pressure, yielding a vulcanizate having a tensile strength of 2430 pounds per square inch, an elongation of 700%, and a durometer hardness of 56.

Example III

| | Parts |
|---|---|
| Crude tall oil (44% rosin) | 36 |
| Acetic anhydride | 36 |
| Hydrogen peroxide (30%) | 8.2 |
| Aluminum chloride | 2.2 |

The crude tall oil was introduced into a glass-lined still and the acetic anhydride and hydrogen peroxide added in successive small portions, the heat of reaction upon the addition of each portion being permitted to dissipate before the succeeding portion was added. The still was cooled with brine during the addition of the reagents. After the initial reaction was completed, the mass was heated to 85° C. and kept at this temperature for 8 hours. Thereafter, the acetic acid was distilled off under vacuum, leaving behind 44 parts of a hydroxylated acetylated tall oil.

The hydroxylated acetylated tall oil produced as just described was mixed with the aluminum chloride, and the mixture heated slightly, whereupon reaction set in and caused the temperature to rise to 135° C. The mixture was subjected to vacuum to withdraw the acid fumes developed. The mass was kept at 140–150° C. for 20 hours, at the end of which time it was cooled, yielding 32 parts of a polymer having the same excellent properties characterizing the product of Example I.

Example IV

| | Parts |
|---|---|
| Butadiene styrene rubber | 100 |
| Sulfur | 2 |
| Stearic acid | 1 |
| Zinc oxide | 5 |
| Tetramethyl thiuram monosulfide | 0.4 |
| Butyraldehyde aniline | 0.15 |
| Channel black | 50 |
| Polymer of Example III | 15.00 |

The above ingredients were compounded on a roll mill in the order named. The resultant compound was free working, moldable, extrudable and tacky. The compound was cured in a press at 40 pounds steam pressure for 20 minutes. The resultant vulcanizate had a Shore hardness of 57 on the type A instrument, exhibited a stress of 485 pounds per square inch at 300% elongation, and an ultimate tensile strength of 2085 pounds per square inch at 725% elongation.

Example V

| | Parts |
|---|---|
| Crude tall oil (44% rosin) | 150 |
| Acetic anhydride | 450 |
| Hydrogen peroxide (28%) | 105 |
| Aluminum chloride | 20 |

The peroxide and acetic anhydride were added to the tall oil and the heat generated by the initial reaction was allowed to dissipate. The mass was then agitated at 80° C. for 7 hours, after which the mass was subjected to distillation to remove the glacial acetic acid. This product was mixed with the aluminum chloride and the mixture held at 150° C. for 18 hours. There was produced a solid polymer having a considerable degree of elasticity. This product was admirably adapted as an adhesive.

Example VI

| | Parts |
|---|---|
| Tall oil polymer (as described in Example I) | 100 |
| Channel black | 30 |
| Sulfur | 2 |
| Zinc oxide | 5 |
| Stearic acid | 1 |
| Tetramethyl thiuram disulfide | 1 |

The above ingredients were compounded on a mill in the order listed. The mass was cured in a mold for 20 minutes at 40 pounds steam. The resultant article was rubbery and moderately elastic, and had a tensile strength of 800 pounds per square inch.

Example VII

The procedure of Example III was precisely repeated, using 2 parts of paratoluene sulfonic acid in place of the aluminum chloride of that example. The resultant polymeric product was indistinguishable in compounding and other properties from the product of Example III.

Example VIII

| | Parts |
|---|---|
| Crude tall oil | 150 |
| Hydrogen peroxide (30% aqueous solution) | 52 |
| Acetic anhydride | 250 |
| Aluminum chloride | 15 |

The tall oil, acetic anhydride and hydrogen peroxide were mixed together with application of cooling to keep the temperature below the boiling point of the constituents. Upon subsidence of the initial reaction, the mixture was held at 85° C. for 7 hours. Thereafter, the mixture was subjected to vacuum distillation to strip off the acetic acid, leaving behind a hydroxylated acetylated tall oil.

The hydroxy acetylated tall oil was mixed with the aluminum chloride, and the mixture heated for 1 hour at 120° C. Thereafter, the mixture was heated at 175° C. for 4 hours. The product, upon cooling, was a polymer having the same excellent properties characterizing the products of the other examples.

From the foregoing general discussion and detailed examples, it is evident that this invention provides novel polymers having in themselves rubbery properties, being flexibly yielding and elastic. The products yield vulcanizates which can be used as low grade rubber substitutes, for instance, in gaskets, can seals, stoppers, mats, electrical and mechanical insulation, floor tile compositions, and the like. Further, the materials blend well with natural and artificial rubbers, rendering the same suitably plastic for working and forming, and also imparting a highly satisfactory flexibility to finished vulcanizates containing them. The products require, as their sole basic raw material, the cheap and abundant tall oils.

The invention having thus been described, what is believed to be novel and is desired to be secured by means of Letters Patent is:

1. A rubber-like polymer produced by polymerizing a hydroxy-acetylated tall oil by condensation by means of heat in the presence of an esterification catalyst serving as a catalyst for the condensation polymerization reaction.

2. A rubber-like polymer produced by polymerizing a hydroxy-acetylated tall oil by condensation by means of heat in the presence of aluminum chloride.

3. A rubber-like polymer produced by polymerizing a hydroxy-acetylated tall oil by condensation by means of heat in the presence of paratoluene sulfonic acid.

4. A vulcanizate produced by vulcanizing with heat a mixture of sulfur and a rubber-like polymer produced by polymerizing a hydroxy-acetylated tall oil by condensation by means of heat in the presence of an esterification catalyst serving as a catalyst for the condensation polymerization reaction.

5. A method of producing a rubber-like material which comprises polymerizing a hydroxy-acetylated tall oil by condensation by means of heat in the presence of an esterification catalyst serving as a catalyst for the condensation polymerization reaction.

6. A method of producing a rubber-like material which comprises polymerizing a hydroxy-acetylated tall oil by condensation by means of heat in the presence of aluminum chloride.

7. A method of producing a rubber-like material which comprises polymerizing a hydroxy-acetylated tall oil by condensation by means of heat in the presence of paratoluene sulfonic acid.

8. A method of producing a rubber-like material which comprises polymerizing a hydroxy-acetylated tall oil by condensation by means of heat in the presence of an esterification catalyst serving as a catalyst for the condensation polymerization reaction, and thereafter removing the catalyst by washing the polymer with water.

9. A method of producing a rubber-like material which comprises polymerizing a hydroxy-acetylated tall oil by condensation by means of heat in the presence of aluminum chloride, and thereafter removing the aluminum chloride by washing the polymer with water.

10. A method of producing a rubber-like material which comprises hydroxylating and acetylating a tall oil, and polymerizing the hydroxy-acetylated tall oil by condensation by means of heat in the presence of an esterification catalyst serving as a catalyst for the condensation polymerization reaction.

11. A method of producing a rubber-like material which comprises hydroxylating and acetylating a tall oil, polymerizing the hydroxy-acetylated tall oil by condensation by means of heat in the presence of an esterification catalyst serving as a catalyst for the condensation polymerization reaction, and thereafter removing the catalyst by washing the polymer with water.

12. A method of producing a rubber-like material which comprises hydroxylating and acetylating a tall oil, polymerizing the hydroxy-acetylated tall oil by condensation by means of heat in the presence of an esterification catalyst serving as a catalyst for the condensation polymerization reaction, and vulcanizing with heat a mixture of the resulting polymer and sulfur.

13. A method of producing a rubber-like material which comprises treating a tall oil with hydrogen peroxide and acetic anhydride, and thereafter polymerizing the hydroxy-acetylated tall oil by condensation by means of heat in the presence of an esterification catalyst serving as a catalyst for the condensation polymerization reaction.

14. A method of producing a rubber-like material which comprises treating a tall oil with hydrogen peroxide and acetic acid, and thereafter polymerizing the hydroxy-acetylated tall oil by condensation by means of heat in the presence of an esterification catalyst serving as a catalyst for the condensation polymerization reaction.

RICHARD RICHTER.
JOHN J. MISKEL.

REFERENCES CITED

The following references are of record in the file of this patent:

UNITED STATES PATENTS

| Number | Name | Date |
|---|---|---|
| 2,228,365 | Reppe et al. | Jan. 14, 1941 |
| 2,307,037 | Gumlich | Jan. 5, 1943 |
| 2,332,849 | Grubber et al. | Oct. 26, 1943 |

FOREIGN PATENTS

| Number | Country | Date |
|---|---|---|
| 618,592 | Germany | Sept. 11, 1935 |